United States Patent [19]

Igarashi et al.

[11] Patent Number: 5,564,102
[45] Date of Patent: Oct. 8, 1996

[54] GLASS MELTING TREATMENT METHOD

[75] Inventors: Hiroshi Igarashi; Hiroaki Kobayashi, both of Hitachinaka; Kazunari Noguchi, Otsu, all of Japan

[73] Assignee: Doryokuro Kakunenryo Kaihatsu Jigyodan, Tokyo, Japan

[21] Appl. No.: 387,848
[22] PCT Filed: Feb. 9, 1994
[86] PCT No.: PCT/JP94/00377
§ 371 Date: Feb. 23, 1995
§ 102(e) Date: Feb. 23, 1995

[30] Foreign Application Priority Data

Jul. 6, 1993 [JP] Japan .................................. 5-191959

[51] Int. Cl.$^6$ ..................................................... G21F 9/00
[52] U.S. Cl. .......................... 588/11; 65/135.7; 65/135.6; 373/146
[58] Field of Search .............................. 588/11; 65/135.7, 65/135.6; 373/146

[56] References Cited

U.S. PATENT DOCUMENTS 3,205,292  9/1965  Descarsin ................................. 373/27

FOREIGN PATENT DOCUMENTS 60-19478  5/1985  Japan .
61-12238  4/1986  Japan .
3-243728  10/1991  Japan .
4-39920   2/1992   Japan .

OTHER PUBLICATIONS

Preliminary Report of 1993 (31st) Spring Meeting of the Atomic Energy Society of Japan (Mar. 27–29, 1993); "H34 application of cold–crucible to melting of waste glass" and its English translation.

Primary Examiner—Ngoclan Mai
Attorney, Agent, or Firm—Wenderoth, Lind & Ponack

[57] ABSTRACT

An object material to be melted (radioactive liquid waste and glass material) 16 is charged into the interior of a cold-crucible induction melting apparatus 10, and a conductor 18 the melting point of which is higher than that of the glass material is inserted into a melting furnace 12. A high-frequency current is supplied to a coil 14 so as to generate heat in the conductor and indirectly heat the glass material. The conductor is withdrawn after a part of the glass material has been put in a molten state. The glass material as a whole is thereafter kept in a molten state while maintaining the induction heating by the molten glass material. The conductor inserted into the melting furnace is, for example, a silicon carbide rod. The surface of the molten material which contacts the inner surface of the melting furnace turns into a solid layer (skull) due to cooling, so that the molten material does not directly contact the refractories. This enables the high-temperature corrosion of the melting furnace to be prevented.

2 Claims, 2 Drawing Sheets

GLASS MELTING TREATMENT METHOD

BACKGROUND OF THE INVENTION

1. Field of the Invention

This invention relates to a method of subjecting a high-level radioactive liquid waste to a vitrification treatment by using cold-crucible induction melting.

2. Description of Related Art

A high-level radioactive liquid waste generated from a reprocessing plant is subjected at present to a vitrification or glassification treatment. The reasons why glass is used are because (1) glass is capable of uniformly solid-solving or dispersing almost all components of waste, (2) glass has an excellent stability, and (3) an industrial glass manufacturing method can be applied to manufacture the glass to be used.

In order to obtain a vitrified body, a glass melting furnace of a directly supplied current type has heretofore been used. Concretely speaking, a mixture of a high-level radioactive liquid waste and a raw glass material is charged into the melting furnace, and the glass is melted by applying heat thereto by using a preheater. When an electric current is supplied between electrodes disposed in the melting furnace, it flows into the molten glass, which is thereby heated to keep all of the materials charged into the furnace melted.

In the conventional melting technique, glass, an object material to be melted contacts directly a structural material (refractory furnace wall and crucible wall) of a melting apparatus under the object material melting temperature conditions. Therefore, the conventional technique poses important problems including the measures for preventing the high-temperature corrosion of the structural materials (i.e. provision of a margin for corrosion or replacement of the structural materials) and limitation on a melting temperature (i.e. setting the highest temperature, at which the strength of the structural materials can be secured, as an upper limit).

SUMMARY OF THE INVENTION

An object of the present invention is to provide a glass melting treatment method capable of simultaneously solving the problem of the high-temperature corrosion of the structural materials of a melting apparatus and the problem of the limitation of a melting operation temperature set on the basis of the heat resisting temperature of the structural materials of the melting apparatus.

To solve these problems, the present invention utilizes a cold crucible induction melting method. When a material to be melted is a metal in the cold-crucible induction melting method, a floating force working on the material occurs due to an operation of an electromagnetic field, so that the material can be melted without causing the same to contact a melting furnace body. Therefore, the characteristics of this method reside in its capability of minimizing the corrosion of the furnace body with the molten material in addition to its capability of melting a material having a high melting point. Accordingly, this method is utilized for melting special metals in the iron and steel industries at present. However, when the cold-crucible induction melting method is used, an object material to be melted necessarily has a conductivity, and this method cannot be utilized as it is for melting glass.

The glass melting treatment method according to the present invention comprises the steps of charging a radioactive liquid waste and a glass material into the interior of a melting furnace in a cold-crucible induction melting apparatus, inserting a conductor the melting point of which is higher than that of the glass material into the interior of the melting furnace, supplying a high-frequency current to a high-frequency coil in the melting apparatus so as to generate heat in the conductor and indirectly heat the glass material with the generated heat, withdrawing the conductor after a part of the glass material has been put in a molten state, and thereafter keeping the glass material as a whole in a molten state while maintaining the induction heating by the molten glass material. The conductor inserted into the melting furnace is, for example, a silicon carbide rod.

A mixture of a radioactive liquid waste and a glass material does not have a conductivity. Therefore, even when a high-frequency current is supplied to the high-frequency coil after this mixture has been inserted into the melting furnace in the cold-crucible induction melting apparatus, heat is not generated in the mixture. However, when a conductor having a high melting point, such as a silicon carbide is present, the electric current flows therethrough, and the conductor is induction heated. Owing to the heat thus generated, the surrounding glass material is heated indirectly and put in a partially molten state in a short time. When the glass material is put in a molten state, it becomes conductive. Consequently, an electric current flows through the molten glass material in response to the high-frequency current flowing in the high-frequency coil, and the glass material is induction heated. Now that the glass material has begun to be induction heated, the conductor such as silicon carbide becomes unnecessary, and the molten glass material is heated directly. The molten region increases gradually, and the whole of the material is melted shortly.

When an object material to be melted is such a glass material, the surface thereof which contacts the inner surface of the melting furnace is cooled to become a solid layer (skull), so that the molten material does not directly contact the refractories, whereby the high-temperature corrosion of the melting furnace can be prevented. Since the melting furnace is cooled with water, the heat resisting temperature thereof does not restrict a melting operation.

DETAILED DESCRIPTION OF PREFERRED EMBODIMENT

Figure 1:
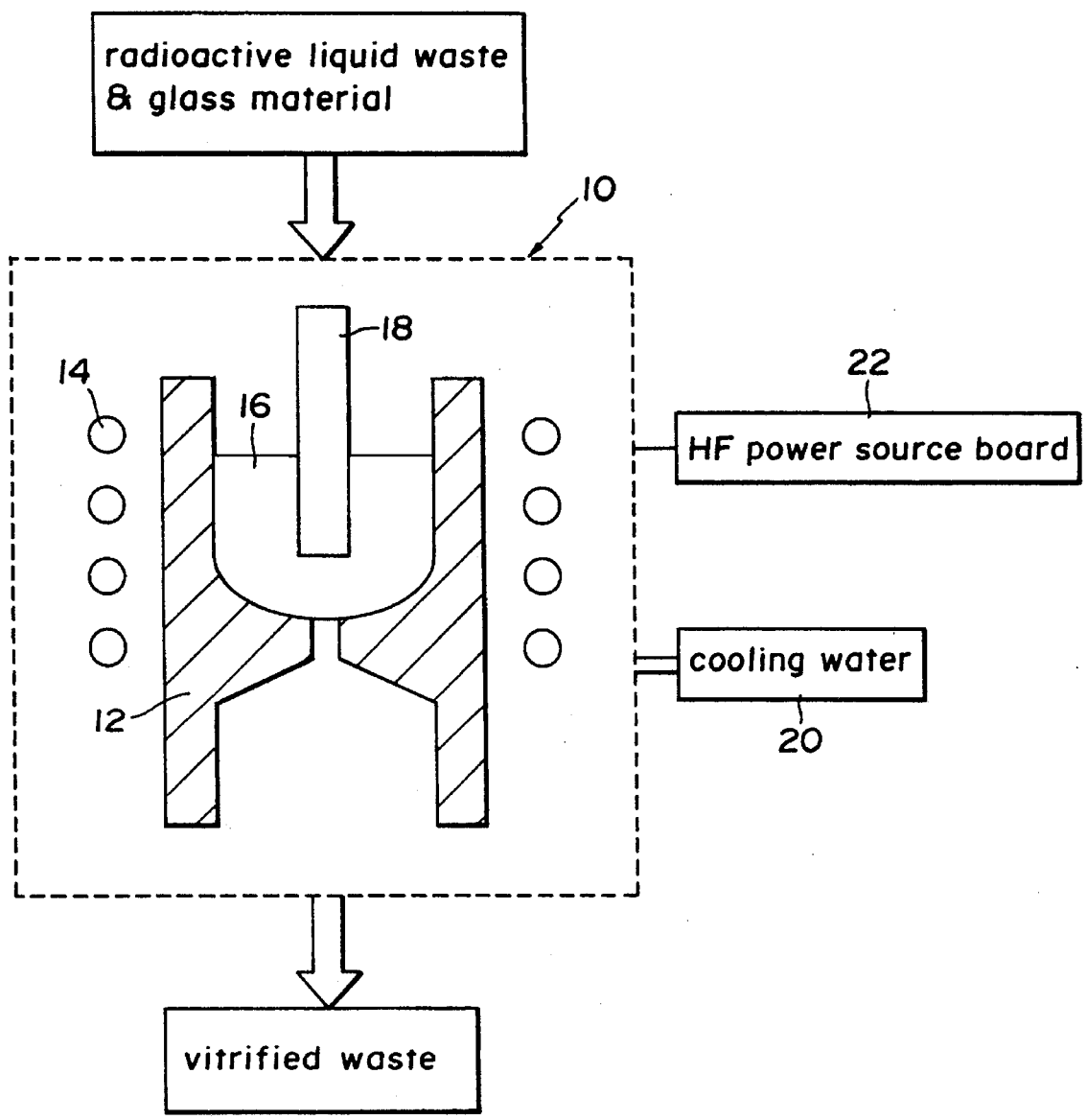
FIG. 1 illustrates an example of a cold-crucible induction melting apparatus used in the present invention.

FIG. 1 illustrates an example of an apparatus for practicing the method according to the present invention. A cold-crucible induction melting apparatus 10 has a slit-divided water-cooling type melting furnace 12 of copper disposed on the inner side of a water-cooled high-frequency coil 14. An object material to be melted 16 (radioactive liquid waste and glass material) and a conductor (silicon carbide rod 18 in this embodiment) the melting point of which is higher than that of the glass material are inserted into this melting furnace 12. The cooling water 20 is then circulated in the apparatus to cool the same, and a high-frequency current is supplied from a high-frequency power source board 22 to the high-frequency coil 14. Consequently, the silicon carbide rod 18 is heated first, and the surrounding object material to be melted 16 is then heated indirectly with the heat generated by the rod, so that the portion of the material 16 around the rod is put in a molten state. The molten glass material has a conductivity. After the glass material has then become able to continue to be in a molten state owing to the heat generated by itself, the silicon carbide rod 18 is withdrawn. The portion of the glass material which is in a molten state is then enlarged by keeping supplying the current to the high-frequency coil 14, until the whole of this material is melted completely.

According to this method, the melting furnace 12 corresponding to the conventional refractory furnace material and crucible is cooled with water, and the surface of the molten glass material contacting the melting furnace 12 turns into a solid layer (skull) due to cooling. Therefore, the molten material does not directly contact the inner surface of the furnace, so that the high-temperature corrosion of the melting furnace 12 does not occur. Since the melting furnace is cooled, the melting operation is not restricted by the heat resisting temperature thereof, and an object material can be melted at an arbitrary temperature with required electric power supplied thereto.

The molten material thus obtained is then poured into a canister (stainless steel container), in which it turns into vitrified waste.

Figure 2:
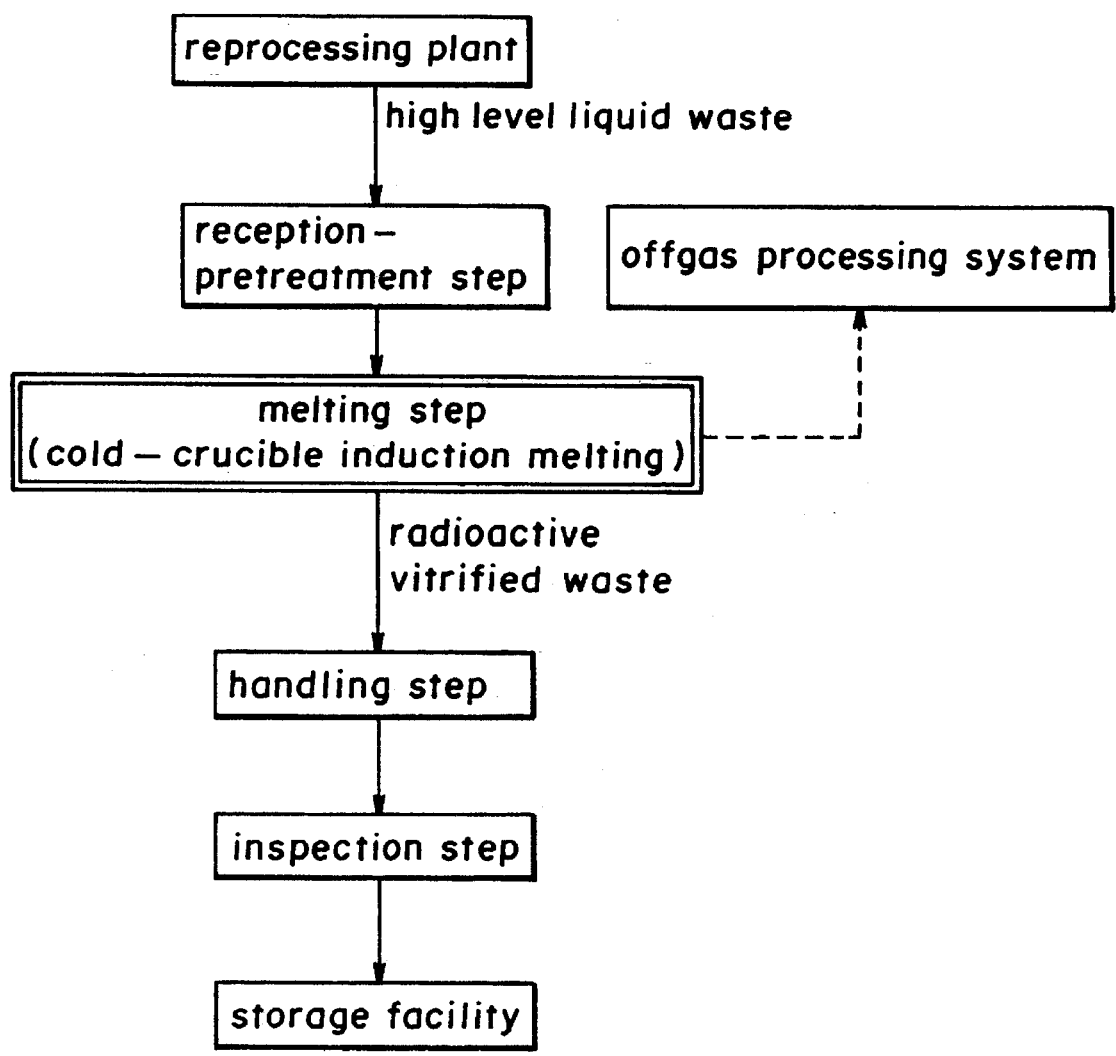
FIG. 2 is a conceptual diagram of a waste treatment process to which the method according to the present invention is applied.

The general constitution of the waste treatment process to which the method according to the present invention is applied is shown in FIG. 2. A high level radioactive liquid waste generated from a reprocessing plant is subjected to a pretreatment, such as condensation or composition regulation in a reception-pretreatment step. The pretreated high level radioactive liquid waste and a glass material are melted in a melting step according to the present invention in which the cold-crucible induction melting technique is utilized. An offgas generated in this step is processed in an offgas processing system. After the melting step has been carried out, the canister in which vitrified waste is packed is capped and welded in a vitrified waste handling step so as to clean the outer side of the canister. The canister with the vitrified waste is then inspected and stored in a vitrified waste storage facility.

An example of an experiment using simulated glass and the results of the experiment will now be described. An apparatus used has construction shown in FIG. 1. A melting furnace is constructed so as to have an inner diameter of 100 mm and a depth of 150 mm and so as to be divided into ten segments. A high-frequency coil has an outer diameter of about 170 mm, a height of about 100 mm and 7 turns. The frequency of a high-frequency power source is 4 MHz.

A melting test was conducted by using simulated glass cullet (having a particle diameter of not more than 2 mm), the composition of which was shown in Table 1, as an object material to be melted. First, 600 g glass sample was inserted into the melting furnace. A hollow tubular silicon carbide rod of 30 mm in outer diameter and 20 mm in inner diameter was then inserted into the melting furnace to a depth of 90 mm measured from an upper surface thereof. After a plate voltage of 5 kV being applied, it was increased at a rate of 1 kV/2 minutes and set to 8 kV. When a cathode current then attained 4.5 A, the silicon carbide rod was withdrawn to ascertain that even the glass alone continued to be induction heated. When a similar operation of the apparatus was carried out with 1200 g of glass sample inserted therein, it was also ascertained that the glass kept being induction heated by itself. The melting temperature after the starting of the melting of the glass could be set freely in the range of 1100° to 1600° C. by regulating the plate voltage. These facts proved that glass of 1200 g at most could be melted completely under the conditions of 1100° to 1600° C. in this test.

TABLE 1

|  | Components | Composition (wt. %) |
|---|---|---|
| Glass Additives | $SiO_2$ | 46.7 |
|  | $B_2O_3$ | 14.3 |
|  | $Al_2O_3$ | 5.0 |
|  | $Li_2O$ | 3.0 |
|  | CaO | 3.0 |
|  | ZnO | 3.0 |
| Waste | $Na_2O$ | 9.6 |
|  | $P_2O_5$ | 0.3 |
|  | $Fe_2O_3$ | 1.9 |
|  | NiO | 0.5 |
|  | $Cr_2O_3$ | 0.5 |
|  | Oxide of F. P. | 9.8 |
|  | Oxide of actinides | 2.4 |
|  | Total | 100.0 |

According to the present invention, an unmelted solid layer called a skull is formed between a molten material and a melting furnace as mentioned above, and the molten material does not directly contact in a molted state the structural materials (refractories) of the melting apparatus, so that the high-temperature corrosion of the structural materials of the apparatus does not occur. Therefore, the lifetime of the melting furnace is prolonged, and the amount of generation of secondary waste can be reduced. In the conventional melting method, the heat resisting temperature of the structural materials of the melting apparatus is an upper limit of the operational temperature of the apparatus. On the contrary, in the present invention, the object material to be melted is directly induction heated, and the structural materials of the apparatus are water-cooled. Therefore, such a limitation is not placed on the operational temperature, so that the glass can be melted at a high temperature.

We claim:

1. A glass melting method for use in vitrification of radioactive liquid waste, comprising the steps of:

charging a radioactive liquid waste and a glass material into an interior of a melting furnace in a cold-crucible induction melting apparatus, inserting a conductor having a melting point which is higher than that of said glass material into an interior of said melting furnace, supplying a high-frequency current to a high-frequency coil disposed in said melting apparatus so as to generate heat in said conductor and to indirectly heat said glass material with the generated heat by induction heating, withdrawing said conductor after a part of said glass material has been changed to a molten state, and thereafter keeping said glass material as a whole in a molten state while maintaining the induction heating by said molten glass material.

2. A method according to claim 1, wherein said conductor inserted into the interior of said melting furnace is a silicon carbide rod.

\* \* \* \* \*